United States Patent
Lewis

(10) Patent No.: US 7,799,909 B2
(45) Date of Patent: Sep. 21, 2010

(54) HYDROPHOBIC STARCH HAVING NEAR-NEUTRAL DRY PRODUCT PH

(75) Inventor: Leonard T. Lewis, Fulton, IL (US)

(73) Assignee: Lenlo Chem, Inc., Fulton, IL (US)

( * ) Notice: Subject to any disclaimer, the term of this patent is extended or adjusted under 35 U.S.C. 154(b) by 120 days.

(21) Appl. No.: 12/106,644

(22) Filed: Apr. 21, 2008

(65) Prior Publication Data

US 2008/0194809 A1    Aug. 14, 2008

Related U.S. Application Data

(63) Continuation of application No. 11/347,947, filed on Feb. 6, 2006, now Pat. No. 7,374,587, and a continuation of application No. 11/063,960, filed on Feb. 22, 2005, now Pat. No. 7,375,214.

(51) Int. Cl.
C07H 1/00 (2006.01)
C08B 31/00 (2006.01)
A61K 31/718 (2006.01)
C07F 7/18 (2006.01)

(52) U.S. Cl. .................. 536/124; 536/120; 514/60; 106/287.13

(58) Field of Classification Search ............. 536/124, 536/120; 514/60
See application file for complete search history.

(56) References Cited

U.S. PATENT DOCUMENTS

| | | | |
|---|---|---|---|
| 2,852,404 A | 9/1958 | Satterthwaite | |
| 2,961,339 A | 11/1960 | Wolff | |
| 3,071,492 A | 1/1963 | Satterly | |
| 3,462,283 A | 8/1969 | Hjermstad et al. | |
| 3,788,945 A | 1/1974 | Thompson et al. | |
| 4,016,117 A | 4/1977 | Griffin | |
| 4,173,488 A | 11/1979 | Vassiliades et al. | |
| 4,293,312 A | 10/1981 | Fox | |
| 4,981,494 A | 1/1991 | Breuil et al. | |
| 5,213,920 A | 5/1993 | Coppens et al. | |
| 5,298,040 A | 3/1994 | Gosset et al. | |
| 5,454,843 A | 10/1995 | Rollin et al. | |
| 5,672,699 A | 9/1997 | Billmers et al. | |
| 6,037,466 A | 3/2000 | Maliczyszyn et al. | |
| 7,374,587 B2 * | 5/2008 | Lewis | 44/313 |
| 7,375,214 B2 * | 5/2008 | Lewis | 536/124 |
| 2002/0015854 A1 | 2/2002 | Billmers et al. | |
| 2003/0145515 A1 | 8/2003 | Pourtout | |

FOREIGN PATENT DOCUMENTS

| | | |
|---|---|---|
| CA | 726667 | 1/1966 |
| GB | 1444335 | 7/1976 |
| JP | 55129493 | 10/1980 |
| JP | 56074513 | 8/1981 |
| JP | 56139590 | 10/1981 |
| JP | 57137389 | 8/1982 |
| WO | WO2006091580 | 8/2006 |

OTHER PUBLICATIONS

International Search Report PCT/US06/06080 dated Feb. 1, 2007, Leiws.

* cited by examiner

*Primary Examiner*—Shaojia Anna Jiang
*Assistant Examiner*—Everett White
(74) *Attorney, Agent, or Firm*—McAndrews, Held & Malloy, Ltd.

(57) ABSTRACT

A free-flowing, hydrophobic starch composition has a near-neutral dry product pH. Methods for making the hydrophobic starch composition by preparing an aqueous mixture comprising a starch, a siliconate, and an acid, where the aqueous mixture has a near-neutral pH, and drying the starch solids to obtain a hydrophobic starch. Novel fuel compositions comprise hydrophobic starch which can be used in internal combustion engines, such as diesel engines. Hydrophobic starch compositions may be used as fuels or fuel components. Novel methods of fueling and operating internal combustion engines use hydrophobic starch as fuel or fuel components.

17 Claims, No Drawings

HYDROPHOBIC STARCH HAVING NEAR-NEUTRAL DRY PRODUCT PH

CROSS-REFERENCE TO RELATED APPLICATIONS

This application is a continuation of U.S. application Ser. No. 11/063,960, filed Feb. 22, 2005, now U.S. Pat. No. 7,375, 214 and a continuation of U.S. application Ser. No. 11/347, 947, filed Feb. 6, 2006, now U.S. Pat. No. 7,374,587 which are incorporated by reference herein.

This invention relates to novel hydrophobic starch compositions having near-neutral dry product pHs and to novel methods of making and using those starch compositions. This invention also relates to novel fuels and fuel components comprising hydrophobic starch compositions.

BACKGROUND OF THE INVENTION

Free-flowing, hydrophobic starches are known in the art and have been used as dusting materials, dry lubricants, and detackifying agents. U.S. Pat. No. 2,961,339 (Wolff et al.) discloses a free-flowing modified starch and methods for preparing the starch by treating with alkyl siliconates. Wolff '339 purportedly discloses a siliconated granular starch which is water-repellant and completely free of undesirable alkalinity. Wolff '339 states that an improved starch is made by drying the starch before washing, so the water-repellant or hydrophobic quality is fixed but the alkalinity is not fixed and may be removed by washing.

U.S. Pat. No. 3,071,492 (Satterly) discloses a free-flowing hydrophobic starch and methods of manufacturing the starch by treating starch in a water slurry with a water-soluble silicone such as monosodium methyl siliconate. Satterly '492 states that its resultant product has dry flow characteristics not found in any raw starch or other starch product, and the flow characteristics resemble those of a fluid rather than a solid.

Wolf '339 and Satterly '492 do not expressly discuss the alkalinity of the slurry or resulting product. In the methods described by both Wolff '339 and Satterly '492, the aqueous mixture of the starch and sodium methyl siliconate would have a highly alkaline pH (e.g., a pH of 12 or higher) due to the siliconate. The free-flowing, hydrophobic starches would have a highly alkaline dry product pH.

Canadian Patent No. 726,667 (Speakman) describes free-flowing, hydrophobic starch and methods of preparation. Speakman '667 discusses a method of treating granule starch with an alkali metal alkyl siliconate to produce a powdered product having high mobility and hydrophobicity and possessing free acidity. Speakman '667 states that a highly mobile, hydrophobic starch product can be produced by mixing an aqueous solution of an alkali metal alkyl siliconate with an aqueous suspension of granular starch, adjusting the pH of the mixture to a low value by the addition of an acid, filtering off the starch without washing, drying the starch cake, and grinding to reduce the product to a powder.

Speakman '667 teaches that Wolff '339 and Satterly '492 operated at a highly alkaline pH and produced highly alkaline starch products. In discussing Wolff '339, the Speakman '667 patent states, "Even after washing and redrying, the products exhibit a high alkalinity." In discussing Satterly '492, the Speakman '667 patent states, "Finally, the free-flowing hydrophobic products made by this method have appreciable alkalinity, as shown by pH values of 10 or greater of mixtures of the product and water after vigorous shaking."

The Speakman '667 patent discloses adjusting the pH of an aqueous mixture of siliconate and starch to a low value by the addition of an acid. In a specific example, the pH of the mixture was adjusted to 2.5 using hydrochloric acid. The resulting starch had a dry product pH of 2.6. The Speakman '667 patent states, "It is possible to provide free-flowing hydrophobic starches having acidic or alkaline levels anywhere in a wide range by intimately mixing finely powdered alkaline products made by the methods of the prior art and acidic products made by the present invention."

The known methods of preparing free-flowing hydrophobic starch products result in starch products which are highly alkaline or highly acidic when dispersed in water. The high alkalinity or high acidity of known starch products when dispersed in water poses the possibility that these starch products might, under some conditions, corrode some materials with which they come into contact. The potential for corrosion limits the desirability of these known methods and compositions where corrosivity is a concern.

While the methods listed above are useful for preparing free-flowing hydrophobic starch, there is a need for a free-flowing hydrophobic starch whose dry product pH is near-neutral.

BRIEF SUMMARY OF THE INVENTION

As one aspect of the present invention, novel methods are provided for preparing a hydrophobic starch having a near-neutral dry product pH. The method comprises preparing an aqueous mixture comprising a starch, a siliconate, and an acid, wherein the aqueous mixture has a near-neutral pH. The near-neutral pH can be achieved in the aqueous mixture by including a suitable amount of acid in the aqueous mixture. Starch solids in the aqueous mixture can be separated by filtering or other means, preferably without washing. Starch solids from the aqueous mixture are dried to form a hydrophobic starch. The dried starch solids can be subjected to grinding or another powderizing step.

The aqueous mixture having a near-neutral pH and comprising the starch and the siliconate can be prepared in a number of ways. For example, the starch and the siliconate can be combined in the aqueous mixture before combining with an acid. An acid can then be added to the aqueous mixture in an amount sufficient to adjust the pH of the aqueous mixture to a near-neutral pH. As another example, the siliconate and the acid can be combined to form an aqueous solution before combining with the starch. The aqueous solution can have a near-neutral pH when the starch is combined.

As another aspect of the invention, novel hydrophobic starch compositions are provided which are free-flowing, hydrophobic, and have a near-neutral dry product pH. Yet another aspect of the invention includes reaction products from the manufacturing methods described herein. For example, a novel hydrophobic starch composition comprises the reaction product of a starch, a siliconate, and an acid, mixed at a near-neutral pH, filtered, and dried to a desired moisture content. Preferably, the reaction product is obtained without washing. The dry product pH of the novel starch compositions and reaction products can be between about 6.9 and about 7.6 or another desirable pH range.

As another aspect, methods are provided for fueling an internal combustion engine which comprises feeding to the engine under combustion conditions a fuel comprising a hydrophobic starch. As yet another aspect, methods are provided for operating an internal combustion engine using a hydrophobic starch as a fuel or a fuel component. For example, the engine can be a diesel engine or an engine that has a spark plug. The methods can include introducing a fuel comprising a free-flowing, hydrophobic starch into a combustion chamber of the engine. The methods can also include introducing sufficient air to the chamber for combustion, and igniting the free-flowing, hydrophobic starch as a fuel for the engine. The fuel or fuel component can be a free-flowing, hydrophobic starch having a near-neutral pH, or one of the highly alkaline or highly acidic free-flowing, hydrophobic starches of the prior art.

As yet another aspect, novel fuels and fuel components are provided. The fuels and fuel components include a hydrophobic starch. Preferably, fuels and fuel components include a free-flowing, hydrophobic starch having a near-neutral dry product pH.

The novel free-flowing hydrophobic starch compositions described herein may be used in the conventional ways or in new ways, as described in detail herein. For example, the free-flowing, hydrophobic starch compositions having near-neutral dry product pH can be used as dusting materials, dry lubricants, and detackifying agents. As another example, the free-flowing, hydrophobic starch compositions are useful as fuels or fuel components for internal combustion engines. As such, the free-flowing, hydrophobic starch compositions constitute a feasible and sensible alternative to petroleum-based fuels, since a fuel or fuel component can be obtained from the inexpensive starch slurry produced during the routine processing operation of conventional wet corn milling. Additionally, the low production cost and lack of free acidity or alkalinity of the novel hydrophobic starch compositions having a near-neutral dry product pH reduces potential corrosiveness. This makes it a superior choice to the prior hydrophobic free-flowing starches in applications such as rubber dusting, dry lubrication, or detackifying. Moreover, the combustion products of the novel hydrophobic starch composition, being of near-neutral pH, will have little or no corrosivity.

DETAILED DESCRIPTION OF THE INVENTION

The compositions and methods described herein relate to the novel preparation of a free-flowing, hydrophobic starch having near-neutral dry product pH. The hydrophobic starch has polymerized siliconate on the starch surface which tends to maintain low moisture content as well as mobility. Thus, a free-flowing, hydrophobic starch has less tendency to absorb moisture which would decrease mobility. A composition will be considered free-flowing when it has equal or better mobility than finely ground starch. An impalpable powder having a sufficiently low moisture content will generally be free-flowing.

Near-neutral pH is neither highly acidic nor highly alkaline. For example, near-neutral pHs include pHs between about 6 and about 8. The free-flowing, hydrophobic starches prepared in Wolff '339, Satterly '492, and Speakman '667 do not have near-neutral dry product pHs. The dry product pH of a composition refers to the pH of an aqueous mixture when the composition is mixed in water at a concentration of 10 g of the composition in 50 ml of distilled water. The present disclosure provides techniques for making hydrophobic starch compositions having dry product pHs greater than 6 or about 6, alternatively greater than 5 or about 5, alternatively greater than 4 or about 4, alternatively greater than 3 or about 3, alternatively greater than 2.6. The present disclosure provides techniques for making hydrophobic starch compositions having dry product pHs less than 8 or about 8, alternatively less than 9 or about 9, alternatively less than 10 or about 10, alternatively less than 11 or about 11, alternatively less than 12. Any of the minimum and maximum pHs set forth above may be combined to define a pH range.

The present techniques for making hydrophobic starch compositions use starches, siliconates and acids. Starches suitable for use herein include corn starch, potato starch, tapioca starch, wheat starch, rice starch, sorghum starch, and the like, as well as combinations of any of the foregoing. Starches are polymeric chains of glucose units. Natural starches from plants are mixes of two types of polymeric chains called amylose and amylopectin, in which the monomers are glucose units joined to one another head-to-tail forming alpha-1,4 linkages. Amylose is a linear polymer of glucose linked with $\alpha(1\rightarrow4)$ bonds. Amylopectin is a highly branched polymer of glucose found in plants. Its glucose units are linked in a linear way with $\alpha(1\rightarrow4)$ bonds, but branching takes place with $\alpha(1\rightarrow6)$ bonds occurring each 24 to 30 glucose units. The relative content of amylose and amylopectin varies between different species of starch.

Starch is generally produced by milling an agricultural product that is a source of starch (for example, corn, potatoes, tapioca, wheat, rice, sorghum, and the like). The product of milling is processed to remove fibers, proteins, and soluble material.

Alkyl siliconates, in the form of the alkali metal salt, have been known as agents for imparting water resistance or water repellency to a wide variety of substrates such as masonry, water-based paint ingredients, powdered materials such as limestone, gypsum, and the like, paper, paperboard, and various textiles. Siliconates are sometimes referred to as silanolates or salts or siliconic acids.

Siliconates include organosiliconates such as alkyl siliconates and phenyl siliconates, and salts thereof. The preferred salts are sodium and potassium salts. Alkali metal alkyl siliconates include those defined by the general formula:

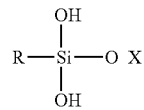

where R is an alkyl group containing 1 or more carbons and X is an alkali metal. The preferred alkali metal alkyl siliconate is sodium methylsiliconate, where R is a methyl group and X is sodium or potassium. Exemplary species of alkali metal organosiliconates include sodium methylsiliconate, sodium ethylsiliconate, sodium propylsiliconate, potassium methylsiliconate, potassium ethylsiliconate and potassium propylsiliconate.

Suitable acids include hydrogen-donating acids, for example, hydrochloric, sulfuric, nitric, phosphoric, and acetic acids. A preferred acid is hydrochloric acid.

The starches, siliconates and acids can be used in the following methods to make free-flowing, hydrophobic starch compositions. An aqueous mixture of starch, siliconate and acid is prepared in any suitable manner. For example, an aqueous slurry of corn starch can be prepared from dry substance granule corn starch, and a siliconate can be combined to form an aqueous mixture comprising the starch and the siliconate. The aqueous mixture can be adjusted to a desired near-neutral pH with the addition of a suitable amount of an acid. Alternatively, the aqueous mixture can be made by a method where a siliconate, preferably sodium methylsiliconate, is combined with an acid in an aqueous solution before combining the starch to form an aqueous mixture. In other words, an aqueous solution can be made from a siliconate and an acid, and the solution can be adjusted to a desired near-neutral pH with a suitable amount of acid.

Typical concentrations of starch in an aqueous slurry include the range of about 30% to about 39% by weight. Any appropriate starch may be used, though untreated corn starch is often preferred for reasons of economy or availability. The slurry can then be agitated by any suitable means. For example, variable or high speed propeller agitators or other types of mixing equipment can be used to agitate the slurry.

As mentioned above, the siliconate can be added to an aqueous slurry comprising starch to form an aqueous mixture of starch and siliconate, or the starch can be added to an aqueous solution comprising the siliconate. The siliconate can be combined with the starch slurry by itself or in combination with an acid. The amount of siliconate can be selected as a proportion of the amount of starch. For example, the concentration of the metal alkyl siliconate preferably will be approximately 0.05% to 5%, alternatively about 0.5% to 1.0%, alternatively about 0.8% by weight compared to the starch.

The pH of the aqueous mixture is adjusted to a desired pH by adding an acid. The pH can be adjusted to a near-neutral pH. The pH can be adjusted to a pH greater than 4 and less than about 10, alternatively between about 5 and about 9, alternatively between about 6 and about 8, alternatively between about 6.5 and about 7.5, alternatively between about 6.8 and about 6.9, using an acid which dissociates sufficiently in water to produce the desired pH.

The aqueous mixture having a near-neutral pH and comprising the starch and the siliconate is agitated for a suitable period, for example at least 30 minutes, although agitation can continue for longer or shorter periods. The starch can then be separated from the aqueous mixture by any effective means, such as by filtration, to obtain starch solids (the wet filter cake resulting from filtration).

The wet filter cake (the starch solids) is then dried to a suitable moisture content to obtain dried starch solids. For example, the filter cake may be dried to a minimum moisture content, such as a moisture content of at least about 6%, alternatively at least about 7%, alternatively at least about 8%, alternatively at least about 9%, alternatively at least about 10%. As another example, the filter cake may be dried to a maximum moisture content, such as at most about 11%, alternatively at most about 12%, alternatively at most about 13.5%. The foregoing minimum and maximum moisture contents may be combined to form ranges.

Drying promotes polymerization of the siliconate, which provides and/or contributes to free-flowing and hydrophobic attributes. Therefore, it is contemplated that the present methods may comprise polymerizing (rather than drying) at least some of the siliconate on at least some of the starch to form a hydrophobic starch. However, drying is the most convenient and practical technique for polymerizing at least some of the siliconate and for obtaining a starch composition having a desired moisture content. Drying temperatures in the range of 160 to 210 degrees Fahrenheit are preferred for drying, though other suitable temperatures, pressures and conditions can also be used and are easily determined.

The dried filter cake (dried starch solids) can then be powderized, such as by grinding or pulverizing, or by sieving the dried starch solids to remove oversize or non-powder material. The wet filter cake before powderizing does not have to be washed, nor does the powder have to be washed. The powder is hydrophobic and free-flowing, and has a near-neutral dry product pH. The method can also include the steps of adjusting the pH of the aqueous mixture with one or more acids, filtering off the starch without washing, drying the starch, then grinding and screening the resulting starch product through a sieve.

As another aspect, free-flowing, hydrophobic starch compositions can be used as a fuel or a fuel component for an internal combustion engine such as a vehicle engine or a generator, including gasoline engines, diesel engines, jet engines, and others. A fuel for an internal combustion engine may consist essentially of a free-flowing, hydrophobic starch composition. In such a fuel, the hydrophobic starch composition is the main source of combustion. Alternatively, a fuel may comprise a hydrophobic starch composition as one fuel component along with other fuel components such as gasoline, diesel, kerosene, or jet fuels. In such a fuel, the hydrophobic starch is one combustible, and one or more other combustibles. Other possible fuel components are alcohols. The foregoing fuels and fuel components may also include detergents, and deposit control agents, as well as various other fuel additives known in the automotive field.

When used in a gasoline internal combustion engine, a fuel comprising a hydrophobic starch is mixed with air in a carburetor and passed to the cylinder, or is introduced by an injector into the cylinder, where a spark plug is timed to generate a spark to ignite a fuel/air mixture. A piston in the cylinder moves axially in a stroke, providing rotational motion to a crank shaft via a connecting rod.

When used in a diesel engine, a fuel comprising a hydrophobic starch is injected into compressed air in an engine cylinder, and the heat of the compressed air ignites the fuel (although a glow plug or other ignition device may be used under some circumstances, such as when the engine is cold). Diesel engines use direct fuel injection—the diesel fuel is injected directly into an engine cylinder by an injection system. Injection systems are known in the art for providing fuel powders to engines.

When used in a jet engine, a fuel comprising a hydrophobic starch is combined with air drawn in at the front which has been compressed. The fuel combined with air is typically ignited by a flame in the eddy of a flame holder, and burned as an atomized mixture. The combustion greatly increases the energy of the gases which are then exhausted out of the rear of the engine. The jet engine generates thrust because of the acceleration of the air through it—the equal and opposite force this acceleration produces is thrust.

The internal combustion engine fueled by free-flowing hydrophobic starch compositions can be used in a wide variety of vehicles and equipment. For example, internal combustion engines fueled by the present fuels and fuel components can power automobiles, trucks, lawn mowers, tractors, farm machinery, trains, marine engines, fire pumps, power generators, jet engines, industrial equipment such as chippers and air compressors, locomotives, mining machinery, and others. This is not an exhaustive list, and it is contemplated that free-flowing, hydrophobic starch compositions are suitable for any use or application of an internal combustion engine.

Free-flowing, hydrophobic starch compositions can be used in standard internal combustion engines, or an engine or its associated equipment (for example, ignition devices or fuel injectors) which may be modified using routine engineering principles to be more suitable for operation using a free-flowing hydrophobic starch composition as a fuel. The use of powdered or particulate fuels for internal combustion engines has been described in the public literature such as, for example, U.S. Pat. No. 3,981,277 (Abom), U.S. Pat. No. 4,052,963 (Stieger), U.S. Pat. No. 4,070,997 (Stieger), U.S. Pat. No. 4,359,970 (Wolters), and U.S. Pat. No. 5,056,469 (Kimberley). Furthermore, powdered or particulate fuels of appropriate size can be used in existing common-rail injection systems, which are currently used with diesel engines and may also be used with gasoline engines. It is believed that free-flowing, hydrophobic starch compositions have not previously been suggested as fuels or fuel component for internal combustion engines.

Where a fuel is provided as a free-flowing powder or particulate slurry, it is desirable that the fuel has particles having an appropriately small particle size. A fuel provided as a free-flowing powder or particulate slurry may be used in place of or in combination with a liquid fuel in an internal combustion engine such as a diesel engine. Such fuels may be in the form of a powder and comprise or consist essentially of a free-flowing hydrophobic starch. Alternatively, such fuels may be provided in fluid form, such as by suspending a hydrophobic starch in liquid or gelled gasoline or kerosene. For example, a free-flowing, hydrophobic starch may be included as a fuel component in a gelled fuel for a jet engine and could provide a significant proportion of the heat of combustion of the fuel.

Fuels comprising free-flowing, hydrophobic starch compositions may have various advantages over other fuels in terms of cost and convenience in handling and manufacture. Powder fuels are likely to be easier to handle than liquid fuels. A free-flowing, hydrophobic starch can be less expensive than ethanol as a fuel, in terms of energy produced divided by cost of production. In general, it is desirable to provide a fuel powder in very finely divided form, such as of a size to pass through a 200 mesh screen or a 150 mesh screen. This fuel powder can be aspirated into a combustion cylinder of the internal combustion engine on a suction stroke. At the end of the compression stroke, the fuel powder can be ignited, such as by the heat of a compression or by a spark generating element, and thereby the fuel is caused to burn and produce a power stroke of the engine's piston. In a diesel engine, the fuel is generally ignited by the heat of the compressed air, though a glow plug is used when the engine is cold.

The near-neutral pH, free-flowing, hydrophobic starch compositions described herein are contemplated for use as fuels in operating internal combustion engines. It is also contemplated that other free-flowing hydrophobic starch compositions, such as those described in Wolff '339, Satterly '492, and Speakman '667, may be used as fuels or fuel components in internal combustion engines. However, free-flowing, hydrophobic starch compositions having a near-neutral dry product pH may be more desirable as fuels and fuel components than the free-flowing, hydrophobic starch compositions of the prior art. The hydrophobic starch compositions having a near-neutral dry product pH are less likely to corrode or otherwise damage engine parts, than prior art compositions which are highly alkaline or highly acidic.

Specific examples of various aspects of the invention are provided below solely for information and education and are not intended to delineate the scope of the invention nor limit the claims. In the examples and throughout this specification, percentages are intended to refer to percent by weight, unless otherwise indicated.

Example 1

Dry unmodified corn starch was suspended in water to create a slurry of 500 mL total volume, containing 210.7 g of starch and 375 g of water.

3.29 g of an aqueous solution of sodium methylsiliconate was added to the starch slurry to create an aqueous mixture. The added solution contained 1.053 g of siliconate solids. The sodium methylsiliconate was provided as 0.5% siliconate solids by weight compared to the dry starch. The pH of the mixture was adjusted to 6.88 using hydrochloric acid.

The mixture was agitated at room temperature for 30 minutes. The pH was measured again to verify that the mixture was in a near-neutral pH range. The pH was 6.68 at the second measurement. The wet starch solids were recovered by filtration on a Buchner funnel. The wet starch solids were not washed.

The filter cake was then dried in a conventional oven at about 180° F. for approximately 4 hours. After drying, the dried starch solids were ground in a roller mill to pass a 150 mesh copper wire screen. A free-flowing, hydrophobic starch having a near-neutral dry product pH was obtained.

Example 2

10 g of the free-flowing, hydrophobic starch composition prepared in Example 1 was placed in 50 mL of distilled water and shaken vigorously for 10 minutes. The pH of this mixture was measured and found to be 6.90. The pH determined in this manner is the "dry product pH" of the hydrophobic starch composition. Thus, the free-flowing, hydrophobic starch from Example 1 had a dry product pH of 6.90.

Example 3

A hydrophobic starch is used as a fuel for an internal combustion engine. A free-flowing hydrophobic starch is introduced to the fuel tank of a diesel vehicle. The Siemens VDO common-rail injection system for diesel engines has injectors that would permit injection of a powder passed through a 150 mesh screen. A free-flowing, hydrophobic starch composition that is a powder with particle sizes less than 150 mesh is used as a fuel with such a system. The free-flowing, hydrophobic starch composition is used as a fuel for an internal combustion engine. The fuel is provided to the engine in free-flowing form and is aspirated into a cylinder on a suction stroke. The fuel is heated by compression to a point at which the finely divided material is ignited by the heat of compression, or by an ignition source such as a glow plug when the engine is cold.

All patents, test procedures, and other documents cited herein are fully incorporated by reference to the extent such disclosure is not inconsistent with this invention and for all jurisdictions in which such incorporation is permitted.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the dependent claims have single dependencies in accordance with U.S. patent practice, each of the features in any of the dependent claims can be combined with each of the features of other independent or dependent claims.

I claim:

1. A method of preparing a hydrophobic starch, wherein the method comprises:
   preparing an aqueous mixture comprising a starch, a siliconate, and an acid, wherein the aqueous mixture has a pH that is greater than or equal to 5 and less than or equal to 9; and
   drying starch solids separated from the aqueous mixture to a moisture content from 6% to 15% to form a hydrophobic starch.

2. The method of claim 1 wherein the starch and the siliconate are prepared in the aqueous mixture and then the acid is added to the aqueous mixture in an amount sufficient to adjust the pH of the aqueous mixture to a pH that is greater than or equal to 5 and less than or equal to 9.

3. The method of claim 1 wherein an aqueous solution comprising the siliconate and the acid is prepared before combining the siliconate with the starch, wherein the aqueous solution has a pH that is greater than or equal to 5 and less than or equal to 9 when the starch is combined with the siliconate.

4. The method of claim 1 comprising filtering starch solids from the aqueous mixture before drying.

5. The method of claim 1 wherein the starch solids are dried to a moisture content from 10% to 13.5%.

6. The method of claim 1 comprising the step of powderizing the dried starch solids.

7. The reaction product of the process of claim 1.

8. A hydrophobic starch composition comprising a reaction product of a starch and a siliconate, and having a dry product pH that is between 5 and 9 and having a moisture content from 6% to 15%.

9. The hydrophobic starch composition of claim 8 wherein the dry product pH is between 6 and 9.

10. The hydrophobic starch composition of claim 8 wherein the dry product pH is at least 6.9 and at most 7.6.

11. A fuel comprising hydrophobic starch, and further comprising a fuel component or a fuel additive, wherein the hydrophobic starch has a dry product pH between 4 and 12.

12. The fuel of claim 11, wherein the hydrophobic starch is free-flowing and has a dry product pH between 6 and 9.

13. The fuel of claim 11, wherein the hydrophobic starch is free-flowing and has a pH that is at least 6.9 and at most 7.6.

14. The fuel of claim 11, wherein the fuel additive is a detergent or a deposit control agent.

15. The fuel of claim 11, wherein the fuel is a slurry.

16. The fuel of claim 11, wherein the fuel is a powder.

17. The hydrophobic starch composition of claim 8 wherein the composition has a moisture content from 10% to 13.5%.

* * * * *